(12) United States Patent
Jung et al.

(10) Patent No.: US 7,786,196 B2
(45) Date of Patent: Aug. 31, 2010

(54) FLAMEPROOF THERMOPLASTIC RESIN COMPOSITION

(75) Inventors: In Chul Jung, Seoul (KR); Bok Nam Jang, Anyang-si (KR); Hee Jung Park, Guri-si (KR); Jung Hwan Yun, Gunpo-si (KR); Jin Hwan Choi, Anyang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 12/430,369

(22) Filed: Apr. 27, 2009

(65) Prior Publication Data

US 2009/0203819 A1 Aug. 13, 2009

Related U.S. Application Data

(63) Continuation-in-part of application No. PCT/KR2006/005849, filed on Dec. 28, 2006.

(30) Foreign Application Priority Data

Nov. 23, 2006 (KR) .............................. 2006-116465

(51) Int. Cl.
 *C08K 5/523* (2006.01)
(52) U.S. Cl. ................. 524/117; 524/140; 524/141
(58) Field of Classification Search ................ 524/117, 524/140, 141
See application file for complete search history.

(56) References Cited

U.S. PATENT DOCUMENTS

| | | | |
|---|---|---|---|
| 4,618,633 A | 10/1986 | Taubitz et al. | |
| 5,061,745 A | 10/1991 | Wittmann et al. | |
| 5,204,394 A | 4/1993 | Gosens et al. | |
| 5,674,924 A | 10/1997 | Lee et al. | |
| 5,674,928 A | 10/1997 | Chisholm et al. | |
| 6,306,941 B1 | 10/2001 | Klatt et al. | |
| 6,716,900 B2 | 4/2004 | Jang et al. | |
| 2002/0016410 A1 | 2/2002 | Katayama et al. | |
| 2004/0058174 A1 | 3/2004 | Kurian et al. | |
| 2009/0062436 A1* | 3/2009 | Breiner .................... | 524/117 |

OTHER PUBLICATIONS

Van Krevelen D.W., Some basic aspects of flame resistance of polymeric materials, Journal of Polymer, Elsevier Science, 1975, vol. 16, pp. 615-620.
International Search Report and Written Opinion in counterpart International Application No. PCT/KR2006/005849, dated Aug. 22, 2007.

* cited by examiner

*Primary Examiner*—Peter Szekely
(74) *Attorney, Agent, or Firm*—Summa, Additon & Ashe, P.A.

(57) ABSTRACT

Disclosed herein is a flameproof thermoplastic resin composition comprising (A) about 5 to about 40 parts by weight of a rubber modified aromatic vinyl copolymer resin; (B) about 30 to about 90 parts by weight of a polycarbonate resin; (C) about 30 to about 90 parts by weight of a polyester resin comprising (c1) about 0.01 to about 99% by weight of a semi-crystalline polyester resin and (c2) about 1 to about 99.99% by weight of a noncrystalline polyester resin; and (D) about 5 to about 30 parts by weight of an aromatic phosphate ester compound, per 100 parts by weight of a base resin comprising (A), (B) and (C).

15 Claims, No Drawings

FLAMEPROOF THERMOPLASTIC RESIN COMPOSITION

CROSS-REFERENCE TO RELATED APPLICATIONS

This non-provisional application is a continuation-in-part application of PCT Application No. PCT/KR2006/005849, filed Dec. 28, 2006, pending, which designates the U.S. and which is hereby incorporated by reference in its entirety, and claims priority therefrom under 35 USC Section 120. This application also claims priority under 35 USC Section 119 from Korean Patent Application No. 10-2006-0116465, filed Nov. 23, 2006, the entire disclosure of which is also hereby incorporated by reference.

FIELD OF THE INVENTION

The present invention relates to a halogen-free flameproof thermoplastic resin composition.

BACKGROUND OF THE INVENTION

Styrenic resins can have excellent mold processability, impact strength, and appearance and have accordingly been widely used in the production of many electric or electronic goods. When a rubber modified aromatic vinyl copolymer resin is used in the production of heat-emitting products, the resin should further have flame retardancy.

A halogen-containing compound and an antimony-containing compound can be added to a rubber modified aromatic vinyl copolymer resin to impart good flame-retardant properties to the resin. However, there are health concerns associated with the use of many halogenated compounds such as polybromodiphenyl ether, which is typically used as the halogen-containing flame retardant. Accordingly, a major concern in this field is the development of a flame retardant-rubber modified aromatic vinyl copolymer resin which is prepared without a halogen-containing compound.

Phosphorous, silicon, boron, or nitrogen compounds can be used as halogen-free flame retardants in resin compositions. However, such compounds may not impart sufficient flame retardancy.

*Journal of Polymer (Elsevier Science*, 1975, vol. 16, pp 615-620) discloses that rubber modified styrene-containing resins have a low Limiting Oxygen Index (LOI), because they do not form char during thermogravimetric analysis (TGA) and combustion. Halogen-containing compounds can readily impart a desired degree of flame-retardancy to a resin, regardless of the kind of resin. On the other hand, as noted herein, rubber modified styrene-containing resins hardly contain char and thus it is difficult to impart sufficient flame retardancy to such resins using only phosphorous- or nitrogen-flame retardants, because these non-halogenated flame retardants typically act on the solid phase.

In order to solve the above problems, U.S. Pat. Nos. 5,061,745, 5,204,394, and 5,674,924 disclose resin compositions that acquire flame retardancy by blending a rubber modified aromatic vinyl copolymer resin, a polycarbonate, and a phosphate ester compound. The presence of the polycarbonate resin makes it easier to impart flame retardancy to the rubber modified aromatic vinyl copolymer resin. However, the composition must include a relatively high amount of polycarbonate (at least 60 parts by weight) to obtain sufficient flame retardancy.

U.S. Pat. Nos. 4,618,633 and 6,716,900 disclose compositions which introduce a polyphenylene ether resin having higher char-forming ability than polycarbonate to a rubber modified styrene copolymer resin. However, it can be difficult to mold the blend of the polyphenylene ether resin and the rubber modified styrene copolymer resin because there is a large difference between the molding temperature of the polyphenylene ether resin and the rubber modified styrene copolymer resin. In general, the polyphenylene ether resin is an engineering plastic molded at a high temperature. In contrast, the rubber modified styrene copolymer resin is molded at a relatively low temperature. Furthermore, the polycarbonate and the polyphenylene ether resin are expensive as compared with other resins, resulting in increased production costs.

The present inventors have developed a resin composition comprising a rubber modified aromatic vinyl copolymer resin, a polycarbonate and a polyethylene terephthalate resin. The polyethylene terephthalate resin has aromatic rings and oxygen atoms in main chain, which tend to form char. However, polyethylene terephthalate resin is a crystalline polymer and polycarbonate is an amorphous polymer. According, blending polyethylene terephthalate resin with polycarbonate resin can deteriorate impact resistance due to phase separation.

SUMMARY OF THE INVENTION

The present invention provides a halogen-free flameproof thermoplastic resin composition including a polycarbonate resin and two types of polyester resins, namely a semi-crystalline polyester and a noncrystalline polyester, as a char source. The thermoplastic resin of the present invention further provides an environmentally friendly flameproof thermoplastic resin composition which has excellent flame retardancy, is economical, and does not exhibit significant deterioration of impact resistance. Further the resin composition of the invention can provide good flame retardancy without requiring the presence of a resin such as polyphenylene ether.

A flameproof thermoplastic resin composition according to the present invention comprises (A) about 5 to about 40 parts by weight of a rubber modified aromatic vinyl copolymer resin; (B) about 30 to about 90 parts by weight of a polycarbonate resin; and (C) about 30 to about 90 parts by weight of a polyester resin comprising (c1) about 0.01 to about 99% by weight of a semi-crystalline polyester resin and (c2) about 1 to about 99.99% by weight of a noncrystalline polyester resin; and (D) about 5 to about 30 parts by weight of an aromatic phosphate ester compound, per 100 parts by weight of a base resin comprising (A), (B) and (C).

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

(A) Rubber Modified Aromatic Vinyl Copolymer Resin

The rubber modified aromatic vinyl copolymer resin according to the present invention is a polymer resin wherein grafted rubbery polymers are dispersed in the form of particles in a matrix of vinyl copolymer. The rubber modified aromatic vinyl copolymer resin can be prepared by polymerizing aromatic vinyl monomer and a monomer copolymerizable with the aromatic vinyl monomer in the presence of a rubbery polymer. The rubber modified aromatic vinyl copolymer resins are prepared by known methods such as emulsion polymerization, solution polymerization, suspension polymerization, or bulk polymerization.

The rubber modified aromatic vinyl copolymer resin can be produced by preparing separately a graft copolymer resin (a1) typically having a high rubber content and an aromatic vinyl copolymer resin (a2) which does not contain rubber and mixing them together. In a bulk polymerization, the rubber modified aromatic vinyl copolymer resin can be prepared in one process without separately preparing the graft copolymer resin (a1) and the aromatic vinyl copolymer resin (a2).

In either case, the rubber content in a final rubber modified aromatic vinyl copolymer resin can range from about 5 to about 30 parts by weight.

Examples of the rubber modified aromatic vinyl copolymer resin may include without limitation acrylonitrile-butadiene-styrene copolymer resin (ABS), acrylonitrile-styrene-acryl rubber copolymer resin (ASA), acrylonitrile-ethylene propylene rubber-styrene copolymer resin (AES), methyl methacrylate-butadiene-styrene copolymer resin (MBS), and the like, and combinations thereof.

In the rubber modified aromatic vinyl copolymer resin, the graft copolymer resin (a1) can be used alone or in combination with a copolymer resin (a2) which does not contain rubber, depending on the compatibility thereof. In exemplary embodiments of the invention, the rubber modified aromatic vinyl copolymer resin comprises about 20 to about 100 parts by weight of a graft copolymer resin (a1) and about 0 to about 80 parts by weight of an aromatic vinyl copolymer resin (a2).

The flameproof thermoplastic resin composition of the present invention can include the rubber modified aromatic vinyl copolymer resin (A) in an amount of about 5 to about 40 parts by weight, per 100 parts by weight of a base resin comprising (A), (B) and (C).

(a1) Graft Copolymer Resin

The graft copolymer resin (a1) useful in the present invention may be prepared by adding an aromatic vinyl monomer and a monomer copolymerizable with the aromatic vinyl monomer to a rubbery polymer and polymerizing them together.

Examples of the rubbery polymer suitable for preparing the graft copolymer resin may include without limitation diene rubbers such as butadiene rubber, styrene-butadiene copolymer, acrylonitrile-butadiene copolymer, and the like; saturated rubbers in which hydrogen is added to a diene rubber; isoprene rubbers; acryl rubbers such as butyl acrylate and the like; and ethylene/propylene/diene terpolymers (EPDM), and the like, and combinations thereof. The content of the rubber in the graft copolymer resin (a1) may be about 10 to about 60 parts by weight. The average size of rubber particles may be in the range of from about 0.05 to about 4 µm, and can be readily determined by the skilled artisan depending on the desired impact strength and surface appearance.

Examples of the aromatic vinyl monomer that can be graft-copolymerized onto the rubber may include without limitation styrene, α-methylstyrene, nuclear-substituted styrene, and the like. These can be used singly or as a combination of at least two. The graft copolymer resin (a1) may include of the aromatic vinyl monomer in an amount of about 20 to about 80 parts by weight.

Examples of the monomer copolymerizable with the aromatic vinyl monomer may include without limitation acrylonitrile, methyl methacrylonitrile, methyl methacrylate, N-substituted maleimide, maleic anhydride, and the like. These can be used singly or as a combination of at least two.

The graft copolymer resin (a1) may include the copolymerizable monomer in an amount of about 5 to about 45 parts by weight.

(a2) Aromatic Vinyl Copolymer Resin

The aromatic vinyl copolymer resin of the present invention may be prepared by copolymerizing an aromatic vinyl monomer and a monomer copolymerizable with the aromatic vinyl monomer.

Examples of the aromatic vinyl monomer may include without limitation styrene, α-methylstyrene, nuclear-substituted styrene, and the like. These can be used singly or as a combination of at least two. The aromatic vinyl copolymer resin (a2) may include the aromatic vinyl monomer in an amount of about 50 to about 95 parts by weight.

Examples of the monomer copolymerizable with the aromatic vinyl monomer may include without limitation acrylonitrile, methyl methacrylonitrile, methyl methacrylate, N-substituted maleimide, maleic anhydride, and the like. These can be used singly or as a combination of at least two. The aromatic vinyl copolymer resin (a2) may include the copolymerizable monomer in an amount of about 5 to about 50 parts by weight.

(B) Polycarbonate Resin

The polycarbonate resin can be prepared by reacting a diphenol represented by the following formula 1 with a phosgene, a halogen formate or a carbonic acid diester:

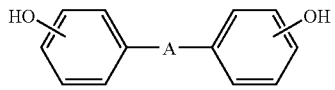

Formula 1 wherein A is a single bond, a $C_{1-5}$ alkylene group, a $C_{1-5}$ alkylidene group, a $C_{5-6}$ cycloalkylidene group, S or $SO_2$.

Examples of the diphenol may include without limitation 4,4'-dihydroxydiphenol, 2,2-bis-(4-hydroxyphenyl)-propane (bisphenol A), 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane, and the like, and combinations thereof. In the present invention, the polycarbonate resin (A) may have a weight average molecular weight (Mw) of about 10,000 to about 200,000, for example about 15,000 to about 80,000.

Suitable polycarbonates incorporated into the composition of the present invention may be branched in a known manner, for example by incorporation of about 0.05 to about 2 mol %, based on the total quantity of diphenols used, of tri- or higher functional compounds, for example, those with three or more phenolic groups.

The flameproof thermoplastic resin composition of the present invention can include the polycarbonate resin in an amount of about 30 to about 90 parts by weight, per 100 parts by weight of a base resin comprising (A), (B) and (C). The polycarbonate resin may make it easier to impart flame retardancy to the resin composition. If the amount of the polycarbonate resin is less than about 30 parts by weight, flame retardancy and mechanical strength of the resin composition may be deteriorated.

(C) Polyester Resin

The polyester resin (C) according to the present invention comprises semi-crystalline polyester resin (c1) and noncrystalline polyester resin (c2). The semi-crystalline and the noncrystalline polyester resin may act as a char source. In addition, the noncrystalline polyester resin can act as a compatibilizer between the polycarbonate and semi-crystalline polyester resin. The polyester resin along with the rubber modified aromatic vinyl copolymer resin and the polycarbonate resin constitutes a base resin.

The polyester resin (C) comprises about 0.01 to about 99% by weight of the semi-crystalline polyester resin (c1) and about 1 to about 99.99% by weight of the noncrystalline polyester resin (c2).

The polyester resin (C) of the present invention may be polyalkylene terephthalate or polyalkylene naphthalate.

In exemplary embodiments of the invention, the polyester resin (C) may be polyethylene terephthalate (PET), polybutylene terephthalate (PBT), polycyclohexane terephthalate (PCT), polyethylene naphthalate (PEN), and the like, and combinations thereof.

The flameproof thermoplastic resin composition of the invention may include the polyester resin in an amount of about 30 to about 90 parts by weight, per 100 parts by weight of the base resin (A), (B), and (C).

(c1) Semi-Crystalline Polyester Resin

Semi-crystalline polyester resins are known in the art and are commercially available, and the skilled artisan will understand the meaning of the term "semi-crystalline polyester." The crystallinity of the semi-crystalline polyester of the present invention may be in the range of about 0.2 to about 55%.

Exemplary semi-crystalline polyester resins (c1) useful in the present invention may include, but are not limited to, polyethylene terephthalate (PET), polybutylene terephthalate (PBT), polycyclohexane terephthalate (PCT), polyethylene naphthalate (PEN), and the like, and combinations thereof. Recycled semi-crystalline polyester resins can also be used.

(c2) Noncrystalline Polyester Resin

The noncrystalline polyester resin (c2) may act as a compatibilizer between the polycarbonate and the semi-crystalline polyester resin to improve impact strength of the resin composition. Noncrystalline polyester resins are known in the art and are commercially available and the skilled artisan will understand the meaning of the term "noncrystalline polyester."

The noncrystalline polyester resin (c2) of the present invention may be prepared by reacting at least two dialcohols with dicarboxyl acid or reacting at least two dicarboxyl acids such as isophthalic acid and terephthalic acid with dialcohol. The use of at least two dialcohols or at least two dicarboxyl acids drops the regularity of polymer chain, thereby inhibiting the crystallization of polyester resin, to provide a noncrystalline polyester resin. The crystallinity of the noncrystalline polyester of the present invention may be no more than about 7% and as another example, no more than about 5%.

Glycol-modified polyalkylene terephthalate, such as poly(alkylene-1,4-cyclohexanedimethylene terephthalate) can be used as the noncrystalline polyester resin (c2). Examples of the noncrystalline polyester resin may include poly(ethylene-1,4-cyclohexanedimethylene terephthalate) (PETG), poly(butylene-1,4-cyclohexanedimethylene terephthalate), and the like. The noncrystalline polyester resin can be used alone or in combination.

The glycol modified polyalkylene terephthalate can be prepared using known techniques by one of ordinary skill in the art. For example, poly(ethylene-1,4-cyclohexanedimethylene terephthalate) may be prepared by esterification of terephthalic acid with ethylene glycol and 1,4-cyclohexanedimethanol (CHDM) as comonomers followed by polycondensation of the resulting ester, which can be easily carried out by one of ordinary skill in the art.

(D) Aromatic Phosphate Ester Compound

The aromatic phosphate ester compound of the present invention is used as a flameproof agent. Exemplary aromatic phosphate ester compounds useful in the present invention are represented by the following Formula 2, but the present invention is not limited to these compounds.

The flameproof thermoplastic resin composition of the invention may include the aromatic phosphate ester compound in an amount of about 5 to about 30 parts by weight, for example about 10 to about 20 parts by weight, per 100 parts by weight of the base resin. If the flameproof thermoplastic resin composition includes the aromatic phosphate ester compound in an amount less than about 5 parts by weight, the resin composition may not have sufficient flame retardancy. On the other hand, if the flameproof thermoplastic resin composition includes the aromatic phosphate ester compound in an amount more than about 30 parts by weight, the heat resistance and mechanical strength of the resin composition may be deteriorated.

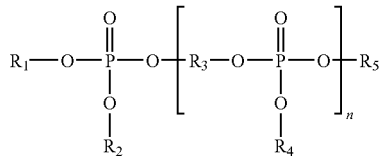

Formula 2 wherein $R_1$, $R_2$, $R_4$, and $R_5$ are each independently $C_6$-$C_{20}$ aryl or $C_1$-$C_{10}$ alkyl-substituted $C_6$-$C_{20}$ aryl, $R_3$ is a derivative of a dialcohol comprising resorcinol, hydroquinol, bisphenol-A, or bisphenol-S; and n is about 0 to about 5.

When n is 0, the compound represented by Formula 2 includes triphenyl phosphate, tricresyl phosphate, cresyl diphenyl phosphate, trixylenyl phosphate, tri(2,4,6-trimethylphenyl)phosphate, tri(2,4-ditertiary butylphenyl)phosphate, tri(2,6-ditertiary butylphenyl)phosphate, and the like.

When n is 1, the compound represented by Formula 2 includes resorcinol bis(diphenylphosphate), hydroquinol bis(diphenylphosphate), bisphenolA-bis(diphenylphosphate), resorcinol bis(2,6-ditertiarybutylphenylphosphate), hydroquinol bis(2,6-dimethylphenylphosphate), and the like.

When n is 2 or more, the compound may be a mixture of oligomer types.

The aromatic phosphate ester compound can be used alone or in combination.

The aromatic phosphate ester compound may also be replaced partially or totally by other conventional phosphorous-containing flame retardants such as red phosphorous, phosphonates, phosphinates, phosphazenes, and the like, and combinations thereof.

The thermoplastic resin composition may further contain anti-dripping agents, impact modifiers, antioxidants, plasticizers, heat stabilizers, light stabilizers, compatibilizers, pigments, dyes, inorganic fillers, and the like, as well as combinations of at least two or more thereof.

The anti-dripping agent may include a fluorinated polyolefin resin such as polytetrafluorethylene.

The inorganic filler may include glass fiber, silica, talc, ceramic, and the like. The flameproof thermoplastic resin composition of the invention can include the inorganic filler in an amount of about 0.01 to about 50 parts by weight, per 100 parts by weight of the base resin, in order to obtain the desired effects and balance of physical properties of the resin composition The resin composition according to the present invention can be prepared using conventional methods. For example, all the components and additives can be mixed together and extruded through an extruder and can be prepared in the form of pellets.

The resin composition according to the present invention can be useful in the production of various articles. The resin composition is particularly suitable for housings for electric or electronic goods.

In exemplary embodiments of the invention, the resin composition can be formed into housings for electronic goods such as printers, computers, word processors, keyboards, PDAs, telephones, mobile phones, facsimiles, copy machines, ECRs, electronic calculators, cards, washing machines, refrigerators, vacuum cleaners, microwave ovens, irons, TV, VTR, DVD players, video cameras, cassette recorders, CD players, speakers, game machines, LCDs, MP3 players, and the like.

The present invention may be better understood by reference to the following examples that are intended for the purpose of illustration and are not to be construed as in any way limiting the scope of the present invention, which is defined in the claims appended hereto. In the following examples, all parts and percentage are by weight unless otherwise indicated.

EXAMPLES (A) Rubber Modified Aromatic Vinyl Resin

The rubber modified aromatic vinyl resin is prepared by mixing 40 parts by weight of the graft copolymer resin (a1) and 60 parts by weight of the aromatic vinyl copolymer resin (a2).

(a1) Graft Copolymer Resin: Graft ABS Copolymer Resin 50 parts of butadiene rubber latex (solid content), 36 parts of styrene, 14 parts of acrylonitrile, and 150 parts of deionized water are mixed. To the mixture, 1.0 part of potassium oleate, 0.4 parts of cumen hydroperoxide, 0.2 parts of mercaptan-containing chain transfer agent, 0.4 parts of glucose, 0.01 parts of ferrous sulfate hydrate, and 0.3 parts of sodium pyrophosphate are added. The blend is kept at 75° C. for 5 hours to obtain g-ABS latex. To the g-ABS latex, 0.4 parts of sulfuric acid is added, coagulated and dried to obtain graft ABS copolymer resin (g-ABS) in powder form.

(a2) Aromatic Vinyl Copolymer Resin: SAN Copolymer Resin 72 parts of styrene, 28 parts of acrylonitrile, 120 parts of deionized water and 0.2 parts of azobisisobutylonitrile (AIBN) are mixed. To the mixture, 0.4 parts of tricalciumphosphate and 0.2 parts of mercaptan-containing chain transfer agent are added. The resultant solution is heated to 80° C. for 90 minutes and kept for 240 minutes. The resultant product is washed, dehydrated and dried to obtain styrene-acrylonitrile copolymer resin (SAN) in powder form. The weight average molecular weight of the styrene-acrylonitrile copolymer resin is 180,000 to 200,000.

(B) Polycarbonate Resin

Panlite L-1225 Grade manufactured by Teijin Company of Japan is used.

(C) Polyester Resin (c1) Semi-Crystalline Polyethylene Terephthalate Resin (PET)

PET1100A Grade manufactured by Any Chem. Co., Ltd. is used.

(c1') Semi-Crystalline Polybutylene Terephthalate Resin (PBT)

1700S Grade manufactured by Samyang Company is used.

(c2) Noncrystalline Polyester Resin (PETG)

SKYGREEN K2012 Grade manufactured by SK Chemical Company is used.

(D) Aromatic Phosphate Ester Compound

PX-200 Grade manufactured by DAIHACHI Chemistry of Japan is used.

Examples 1-6 and Comparative Examples 1-3

The components as shown in Table 1 are mixed and the mixture is extruded at 220 to 250° C. with a conventional twin-screw extruder into pellets. The resin pellets are dried at 80° C. for 3 hours, and molded into test specimens for measuring flame retardancy using a 6 oz injection molding machine at 230° C. and mold temperature of 60° C. The flame retardancy is measured in accordance with UL94 under a thickness of 2.5 mm. The Izod impact strength is measured in accordance with ASTM 256A under a thickness of ⅛".

TABLE 1

| | | Examples | | | | | | Comparative Examples (parts by weight) | | |
|---|---|---|---|---|---|---|---|---|---|---|
| | | 1 | 2 | 3 | 4 | 5 | 6 | 1 | 2 | 3 |
| (A) | | 20 | 10 | 20 | 25 | 25 | 25 | 20 | 20 | 30 |
| (B) | | 40 | 60 | 50 | 45 | 45 | 45 | 40 | — | — |
| (C) | (c1) | 30 | 20 | 25 | 20 | 15 | — | 40 | 80 | 70 |
| | (c1') | — | — | — | — | 5 | 20 | — | — | — |
| | (c2) | 10 | 10 | 5 | 10 | 10 | 10 | — | — | — |
| (D) | | 18 | 18 | 18 | 18 | 18 | 18 | 18 | 18 | 18 |
| ⅛" Izod impact strength (kgf·cm/cm) | | 50 | 45 | 53 | 58 | 57 | 55 | 13 | 10 | 12 |
| Flame Retardancy (UL 94, 2.5 mm thickness) | | V-0 | V-0 | V-0 | V-0 | V-0 | V-0 | V-0 | Fail | Fail |

As shown above, Examples 1 to 6 have excellent impact strength as well as V-0 flame retardancy. However, Comparative Example 1 has poor impact strength, although it obtains V-0 flame retardancy. Comparative Examples 2 and 3 show that the impact strength and flame retardancy are deteriorated although they employ the same amount of flame retardant as the Examples of the invention.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A flameproof thermoplastic resin composition, comprising:
   (A) about 5 to about 40 parts by weight of a rubber modified aromatic vinyl copolymer resin;
   (B) about 30 to about 90 parts by weight of a polycarbonate resin;
   (C) about 30 to about 90 parts by weight of a polyester resin comprising (c1) about 0.01 to about 99% by weight of a semi-crystalline polyester resin and (c2) about 1 to about 99.99% by weight of a noncrystalline polyester resin; and
   (D) about 5 to about 30 parts by weight of an aromatic phosphate ester compound, per 100 parts by weight of a base resin comprising (A), (B) and (C).

2. The flameproof thermoplastic resin composition of claim 1, wherein said rubber modified aromatic vinyl copolymer resin comprises (a1) about 20 to about 100 parts by weight of a graft copolymer resin, and (a2) about 0 to about 80 parts by weight of an aromatic vinyl copolymer resin.

3. The flameproof thermoplastic resin composition of claim 2, wherein said graft copolymer resin (a1) is a graft copolymer of about 10 to about 60 parts by weight of a rubbery polymer, about 20 to about 80 parts by weight of an aromatic vinyl monomer, and about 5 to about 45 parts by weight of a monomer copolymerizable with the aromatic vinyl monomer; and said aromatic vinyl copolymer resin (a2) is a copolymer of about 50 to about 95 parts by weight of an aromatic vinyl monomer, and about 5 to about 50 parts by weight of a monomer copolymerizable with the aromatic vinyl monomer.

4. The flameproof thermoplastic resin composition of claim 3, wherein said rubbery polymer is selected from diene rubbers, saturated rubbers in which hydrogen is added to said diene rubbers, isoprene rubbers, chloroprene rubbers, acryl rubbers, ethylene/propylene/diene terpolymers (EPDM), or a combination thereof, said aromatic vinyl monomer is selected from styrene, α-methylstyrene, nuclear-substituted styrene, or a combination thereof, and said monomer copolymerizable with the aromatic vinyl monomer is selected from acrylonitrile, methyl methacrylonitrile, methyl methacrylate, N-substituted maleimide, maleic anhydride, or a combination thereof.

5. The flameproof thermoplastic resin composition of claim 1, wherein said rubber modified aromatic vinyl copolymer resin (A) comprises acrylonitrile-butadiene-styrene copolymer resin (ABS), acrylonitrile-styrene-acryl rubber copolymer resin (ASA), acrylonitrile-ethylene propylene rubber-styrene copolymer resin (AES), or a combination thereof.

6. The flameproof thermoplastic resin composition of claim 1, wherein said semi-crystalline polyester resin (c1) comprises polyalkylene terephthalate or polyalkylene naphthalate.

7. The flameproof thermoplastic resin composition of claim 6, wherein said semi-crystalline polyester resin (c1) comprises polyethylene terephthalate (PET), polybutylene terephthalate (PBT), polycyclohexane terephthalate (PCT), polyethylene naphthalate (PEN), or a combination thereof.

8. The flameproof thermoplastic resin composition of claim 1, wherein said noncrystalline polyester resin (c2) is prepared by reacting at least two dialcohols with dicarboxyl acid or reacting at least two dicarboxyl acids with a dialcohol.

9. The flameproof thermoplastic resin composition of claim 8, wherein the noncrystalline polyester resin (c2) comprises a glycol-modified polyalkylene terephthalate.

10. The flameproof thermoplastic resin composition of claim 9, wherein the glycol-modified polyalkylene terephthalate comprises a poly(alkylene-1,4-cyclohexanedimethylene terephthalate).

11. The flameproof thermoplastic resin composition of claim 10, wherein the poly(alkylene-1,4-cyclohexanedimethylene terephthalate) comprises poly(ethylene-1,4-cyclohexanedimethylene terephthalate) (PETG), poly(butylene-1,4-cyclohexanedimethylene terephthalate), or a combination thereof.

12. The flameproof thermoplastic resin composition of claim 1, wherein said noncrystalline polyester resin (c2) is poly(alkylene-1,4-cyclohexane dimethylene terephthalate).

13. The flameproof thermoplastic resin composition of claim 1, wherein said aromatic phosphate ester compound (D) is represented by the following Formula:

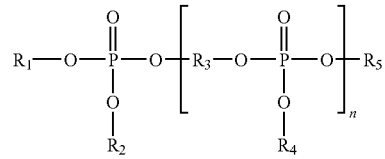

wherein $R_1$, $R_2$, $R_4$, and $R_5$ are each independently $C_6$-$C_{20}$ aryl or alkyl-substituted $C_6$-$C_{20}$ aryl, $R_3$ is a derivative of a dialcohol comprising resorcinol, hydroquinol, bisphenol-A, or bisphenol-S; and n is about 0 to about 5.

14. The flameproof thermoplastic resin composition of claim 1, further comprising an additive selected from anti-dripping agents, impact modifiers, antioxidants, plasticizers, heat stabilizers, light stabilizers, compatibilizers, pigments, dyes, inorganic fillers or a combination thereof.

15. A molded article prepared with the flameproof thermoplastic resin composition as defined in claim 1.

* * * * *